United States Patent [19]

Heiremans et al.

[11] 4,361,237

[45] Nov. 30, 1982

[54] HEAT SEALABLE PACKAGING FILM PRODUCING A PEELABLE SEAL

[75] Inventors: Robert Heiremans, Mariakerke; Roland Jacobs, Wetteren; Marc D'Hondt, Nazareth, all of Belgium

[73] Assignee: UCB Societe Anonyme, Drogenbos, Belgium

[21] Appl. No.: 274,366

[22] Filed: Jun. 17, 1981

[30] Foreign Application Priority Data

Jun. 20, 1980 [GB] United Kingdom ............... 8020329

[51] Int. Cl.$^3$ .............................................. B65D 5/64
[52] U.S. Cl. .................................... 206/631; 229/43; 428/35; 525/222; 525/240
[58] Field of Search .................... 428/35; 206/631; 229/43; 525/222, 240, 241

[56] References Cited

U.S. PATENT DOCUMENTS

| | | | |
|---|---|---|---|
| 3,399,250 | 8/1968 | Kirk et al. | 525/222 |
| 3,663,663 | 5/1972 | McAda | 525/222 |
| 3,879,492 | 4/1975 | Bontinick | 525/240 |
| 3,946,871 | 3/1976 | Sturm | 229/43 |
| 4,215,797 | 8/1980 | Chen | 229/43 |
| 4,252,846 | 2/1981 | Romesberg et al. | 206/631 |
| 4,311,808 | 1/1982 | Su | 525/222 |

*Primary Examiner*—William R. Dixon, Jr.
*Attorney, Agent, or Firm*—Wenderoth, Lind & Ponack

[57] ABSTRACT

A heat sealable packaging film particularly suitable for producing a peelable seal by heat sealing on polystyrene.

For this purpose, the composition of the film comprises:
(a) 50 to 70% by weight of at least one ethylene polymer having a melt index of 0.5 to 7 g/10 min and selected from polyethylene having a density of from 0.910 to 0.925 g/cm$^3$ and an ethylene-vinyl acetate copolymer containing at most 7% by weight of vinyl acetate.
(b) 20 to 30% by weight of at least one ethylene-vinyl acetate copolymer containing 20 to 30% by weight of vinyl acetate and having a melt index of 0.5 to 7 g/10 min, and
(c) 10 to 20% by weight of a styrene homopolymer having a melt index of 0.5 to 7 g/10 min.

Also provided are packages including a container made from polystyrene and a covering film for the said container, which is made from the aforesaid film, laminated or not on other films.

7 Claims, No Drawings

HEAT SEALABLE PACKAGING FILM PRODUCING A PEELABLE SEAL

The present invention relates to a heat sealable packaging film producing a peelable seal when it is heat sealed on polystyrene. It also relates to a package which comprises a container made from polystyrene or from high-impact polystyrene and a covering film for the said container which is made from or comprising the above-mentioned heat sealable packaging film. This package can, in particular but not exclusively, be used for packaging foodstuffs.

Currently, containers of various shapes, made from polystyrene, are used for packaging liquid and pastry products, such as dairy products (yoghurts, creams, cream cheese, ice-creams and the like), pork butcher's meats, deep-frozen ready-cooked meals and the like. These containers are manufactured from films, sheets or plates of polystyrene or of high-impact polystyrene, to which the desired shape is imparted, for example by thermoforming. These containers generally possess a base and a sidewall which extends upwards from this base, thus forming a type of tray or tub of cylindrical, truncated-cone, square, rectangular or even polygonal shape, depending on the nature of the article to be packaged.

These polystyrene containers are generally hermetically sealed by means of a protective covering film. For this purpose, the sidewall of these containers terminates at its upper end in a radially outwardly directed flat flange, the covering film being placed flat on the polystyrene flange and sealed under pressure and at a high temperature. This heat sealing operation is generally carried out on a set of containers, which set may or may not be cut after heat sealing, so as to be sold in the form of a single package unit or in the form of a set containing a certain number of package units.

Hitherto, aluminum foils of at least 30 micrometers thickness or laminates consisting of such an aluminum foil and one or more films of a different nature, for example a polyester film, have been used as the covering foil for these polystyrene containers. These aluminum foils are also provided with a varnish or a coating, which allows the foils to be heat sealed against the polystyrene flange.

The closure thus produced is generally sufficient to ensure that the package remains unopened and tight during normal handling and during transportation and storage. Furthermore, the package can only be opened at the seals by the user when he wishes to use the packaged article.

However, this method of closure of polystyrene containers suffers from several disadvantages.

In use, it has been found that opening these packages presents a certain number of difficulties. When, in order to obtain access to its contents, the user attempts to open the package by exerting a traction force on the covering foil so as to separate it from the flange of the container, it is frequently found that the foil is only partially detached from the periphery of the flange of the container. At a certain moment, the heat sealed bond no longer yields and the covering foil tears, with a portion of the foil remaining firmly attached to the flange of the container. This difficulty is due to the fact that the mechanical strength of the seal formed between the varnished aluminum and the polystyrene is greater than the tear strength of the aluminum foil.

Another disadvantage of this method of closure is that, in order to obtain a sufficiently strong heat sealed bond between the varnished aluminum foil and the polystyrene flange, it is necessary to carry out the sealing at very high temperatures of the order of 200° to 250° C.

It would therefore be interesting to find a more convenient means for closing polystyrene containers which do not have these drawbacks.

Several methods have been proposed in the past, which enable the formation of so-called "peelable" closing seals. Such seals have a mechanical strength which is, at the same time, sufficiently high to keep the package intact until it has to be opened by the consumer and sufficiently low to enable manual opening of the package, without the use of any auxiliary instrument.

According to one of these methods, use is made of adhesive compositions specially designed to allow the package to be closed with a seal of low strength. Thus, for example, in British Pat. No. 1,093,671, heat sealable adhesive compositions are proposed with which peelable seals between certain specified packaging materials can be realized (paper, board, polyethylene films and the like). These compositions consist essentially of two components, i.e. on the one hand, an ethylene-vinyl acetate copolymer and, on the other hand, a homo- or copolymer of at least one mono-ethylenically unsaturated monomer, for example polystyrene.

The major drawback of this method is that one has to have at its disposal special adhesive compositions for the formation of the peelable seals. Moreover, this method requires a supplementary step of coating these compositions on at least one surface of the packaging materials. These compositions are indeed not film-forming and, consequently, they have to be previously coated on a supporting material.

We tried to prepare by blow extrusion a packaging film from a composition proposed in this British Patent, more particularly that which comprises one part by weight of an ethylene-vinyl acetate copolymer containing 28% by weight of vinyl acetate (Elvax 260) and one part by weight of polystyrene. But, the composition did not lend itself at all to the production of such a film.

Another and better method consists in forming peelable seals by directly heat sealing together two packaging films, i.e. without the use of an adhesive composition. But in this technique the difficulty resides in finding those packaging films that are capable of producing peelable seals on heat sealing them together.

With most packaging films now available it is not possible, however, to produce peelable seals on polystyrene. In general, no seal at all is produced, or, at best, a seal of insufficient mechanical strength, with the result that the package does not resist the external solicitations during its normal handling and it can easily open accidentally.

In U.S. Pat. No. 3,879,492, a heat sealable packaging film is described which produces a peelable seal when it is heat sealed to itself or to various other packaging films, particularly to low density or high density polyethylene, polypropylene and polybutene films. The mechanical strength, which ensures the peelability of the seal is obtained by appropriate selection of the polymer constituents entering into the composition of the film. However, the films proposed in this U.S. Patent are not capable of producing a peelable seal on polystyrene.

It is therefore still of interest to find a film, the chemical constituent of which is such that it produces a faultless peelable seal when heat sealed on polystyrene.

But in order to achieve this aim, it is not sufficient to find a film-forming composition which ensures the production of a peelable seal on polystyrene. Indeed, it must be possible to produce the film easily by conventional extrusion methods, more particularly by blow extrusion. In that light, it is also necessary for the film thus produced to have the usual physical properties of a packaging film, i.e. it must have amongst others good properties of flexibility, impact strength and tear resistance. Furthermore, this film must lend itself, without difficulties, to reeling, laminating, heat sealing and printing on conventional machinery. Finally, according to another aspect, the cost of the film must be as low as possible.

The present invention provides a solution to these various problems. Thus, one object of the present invention is to provide an excellent packaging film which is capable of producing a peelable seal when it is heat sealed on polystyrene.

A further object of the present invention is to provide a packaging film which, by virtue of this property, can be usefully employed as a covering film for the hermetic sealing of containers made from polystyrene or from high-impact polystyrene, without exhibiting the various disadvantages referred to above.

These and other objects are attained, according to the present invention, by the provision of a heat sealable packaging film producing a peelable seal comprising:
(a) 50 to 70% by weight of at least one ethylene polymer having a melt index of 0.5 to 7 g/10 min and selected from polyethylene having a density of from 0.910 to 0.925 g/cm$^3$ and an ethylene-vinyl acetate copolymer containing at most 7% by weight of vinyl acetate,
(b) 20 to 30% by weight of at least one ethylene-vinyl acetate copolymer containing 20 to 30% by weight of vinyl acetate and having a melt index of 0.5 to 7 g/10 min, and
(c) 10 to 20% by weight of a styrene homopolymer having a melt index of 0.5 to 7 g/10 min.

A film of this composition effectively produces a perfect peelable seal when it is heat sealed on polystyrene. We have found that the seal thus obtained on polystyrene has the following characteristics:
(1) its peel strength is between 300 and 800 g per cm of seal width; this strength is, at the same time, sufficiently high to keep the package intact until it is opened by the user and sufficiently low to allow the package to be opened by hand without the use of any auxiliary instrument;
(2) it can be ruptured at the original interface between the film and the polystyrene which were used to form the seal, without producing a tear or any deformation in the material of either of these;
(3) it can be ruptured homogeneously, i.e. without leaving irregular residues of film on the face of the polystyrene or, conversely, residues of polystyrene on the face of the film used to form the seal; and
(4) it can be ruptured by merely pulling by hand, without moving by jerks.

Another object of the invention is to provide an improved package comprising a container made from polystyrene or from high-impact polystyrene and a covering film for the said container, which not only ensures hermetic closure of the container by heat sealing under moderate conditions but also, and above all, is easy and convenient to open by hand, in that the difficulties observed with the covering films used hitherto are not encountered.

Thus, according to the present invention, there is further provided a packaging comprising (1) a container made from polystyrene or from high-impact polystyrene, said container having a base and a sidewall which extends upwardly therefrom and terminates at its upper end in a radially outwardly directed flange, and (2) a covering film for said container which is heat sealed to the said flange by a peelable seal, the covering film being made from a heat sealable packaging film having the above-defined composition.

This package has numerous advantages compared to those of the prior art. Thus, when the user opens the package to obtain access to its contents, no difficulty whatsoever arises; the user can, by simple pulling by hand, detach the covering foil gradually from the entire periphery of the polystyrene flange of the container without tearing the film material since the seal formed by heat sealing between the covering film and the polystyrene flange is a peelable seal which has the above mentioned characteristics (1) to (4). Furthermore, after filling the container with the articles to be preserved, the container can be closed with the covering film by means of simple and relatively non-specific heat sealing equipment, given that excellent peelable seals can be obtained at sealing temperatures of between 150° and 200° C., and by using sealing pressures below 98 N/cm$^2$, in contradistinction to varnished aluminum foils which require higher sealing temperatures and pressures. In addition, it is no longer necessary to use aluminum foils of at least 30 micrometers thickness provided with a heat-sealable varnish, which is a considerable economic advantage. However, this does not mean that a laminate of the film according to the present invention with an aluminum foil cannot be produced and the laminate thus produced used as a covering film. In that case, a much thinner aluminum foil, for example one having a thickness of 9 micrometers or less, can be used, because it is the film according to the present invention which has the function of producing a peelable seal on the flange of the container, whilst the aluminim foil only plays a secondary role, such as for example, providing the package with a more decorative appearance. The same effect may also be obtained by depositing a thin film of metal (which is usually aluminum) by vacuum metallization on the external face of the covering film.

Other advantages will become apparent from the following description.

The chemical composition of the packaging film according to the present invention is particularly critical.

The constituent (a) of the film according to the present invention is either a polyethylene having a density of from 0.910 to 0.925 g/cm$^3$, i.e. a low density polyethylene, or an ethylene-vinyl acetate copolymer in which the vinyl acetate content represents at most 7% by weight, or mixtures thereof. Thus, we found that if an ethylene-vinyl acetate copolymer, the vinyl acetate content of which exceeds 7% by weight, is used as constituent (a), the film obtained is so tacky that it is virtually no longer possible to handle it on manufacturing and converting machinery.

Furthermore, these ethylene polymers must have a melt index of 0.5 to 7 g/10 min. If use is made of an ethylene polymer, the melt index of which falls outside the above-mentioned range, then the desired result is no longer obtained. Thus, for example, if an ethylene polymer having a melt index of 0.3 or 0.2 g/10 min is used, the strength of the seal obtained by heat sealing the film on a polystyrene sheet is less than 200 g per cm of seal width, which is totally insufficient to provide a hermetically sealed package.

The amount of constituent (a) present in the composition of the film represents 50 to 70% by weight and preferably 60 to 65% by weight, referred to the total weight of the polymers present.

The constituent (b) of the film according to the present invention is an ethylene-vinyl acetate copolymer with a vinyl acetate content of from 20 to 30% by weight and having a melt index of from 0.5 to 7 g/10 min. The vinyl acetate content of this copolymer is particularly critical. Indeed, we have found that if use is made of an ethylene-vinyl acetate copolymer which does not have the stated content of vinyl acetate, for example where the amount of vinyl acetate is 18% by weight, the strength of the seal produced on polystyrene is insufficient (less than 200 g/cm of seal width). Furthermore, these ethylene-vinyl acetate copolymers must be present in the composition of the film according to the present invention in an amount of from 20 to 30% by weight and preferably of from 25 to 30% by weight, referred to the total weight of the polymers present: below the lower limit of 20% by weight and above the upper limit of 30% by weight, it is no longer possible to obtain peelable seals on polystyrene. Furthermore, above an amount of 30% by weight, the film is excessively tacky which makes it difficult to subject it to blow extrusion, reeling and laminating operations.

The constituent (c) of the film according to the present invention is a styrene homopolymer having a melt index of 0.5 to 7 g/10 min. It must be present in the composition of the film in an amount of from 10 to 20% by weight and preferably of 10% by weight, referred to the total weight of the polymers present. When its content in the composition of the film is too low, for example 5% by weight or less, the film obtained has a tacky surface, which results in serious complications during the operations of extruding, reeling and laminating the film. Thus, we have found that during reelings, the film tends to adhere to the reels, whilst during laminating the film tends to form creases. On the other hand, it is not advisable to exceed an amount of 20% by weight because, beyond this amount, a film of poor quality is obtained which tears easily.

To sum up, it is clear that the nature and the respective proportions of the three constituents (a), (b) and (c) are essential and indispensable not only for obtaining a film capable of producing a peelable seal when it is heat sealed on polystyrene but also for obtaining a good packaging film which lends itself, without difficulties, to extrusion, reeling and laminating operations on conventional machinery.

To prepare the packaging film according to the present invention, the polymeric constituents (a), (b) and (c) are preferably used in the form of powders or granules.

The composition of the film producing a peelable seal according to the present invention may also contain the fillers and/or adjuvants which are commonly used in the manufacture of packaging films.

Fillers can, for example, be added to make the film opaque and/or to impart additional hardness thereto. Talc, titanium dioxide, kaolin, zeolites, silica, micronized mica, zinc oxide, aluminum oxide, natural or precipitated calcium carbonate, magnesium carbonate, barytine and the like are examples of fillers which can be added. These fillers are used in the form of powders, the particle size of which should not be greater than 50 micrometers, and they can be added to the composition of the film in amounts of up to about 10% by weight, referred to the total weight of the polymer constituents (a), (b) and (c).

The adjuvants which can be used include heat-stabilizers, such as diphenylthiourea, alpha-phenylindole, barium, cadmium and/or zinc palmitate and/or stearate, tris-nonylphenyl phosphite and the like; antioxidants, such as 4,4'-thio-bis-(6-tert.butyl-m-cresol), 4,4'-methylene-bis-(2,6-di-tert.butyl-phenol), hydroxytoluenes containing butyl groups and the like; optical bleaching agents, such as sulfonated derivatives of stilbene; organic dyestuffs, such as phthalocyanines, azo dyes, chlorinated indanthrenes and the like; inorganic pigments, such as zinc chromate, cadmium sulfide and iron oxide; antistatic agents; and lubricants, such as magnesium stearate, calcium stearate and paraffin oil. These adjuvants can be added to the film composition in an amount of up to about 5% by weight, referred to the total weight of the polymer constituents (a), (b) and (c).

In order to manufacture the film with a peelable seal according to the present invention, the appropriate amounts of the polymers and, optionally, of the fillers and the adjuvants are homogenized together at ambient temperature in a mixer of conventional construction and preferably of the ordinary rotary type.

An appropriate method of homogenizing this mixture is to prepare master batches with at least one of the polymers, the fillers and the adjuvants, and then to homogenize the master batches with the remaining polymers.

The homogeneous mixture thus obtained is extruded in an apparatus of conventional design, in which the mixture is heated to a temperature of at most 290° C.

The extruder may have one or more extrusion screws; however, all that matters is that the composition obtained should be homogeneous at the outlet of the die.

As is well known, the mechanical properties can be further varied depending upon whether the extrusion takes place through a slit die or by the blow extrusion technique. In this latter case, the cooling rate and the blowing rate can also be varied as desired.

At the outlet of the extruder, one of the faces of the film can be superficially pretreated by flame or by corona discharge in order to enable that face to be printed and/or laminated to other films. It should be noted however that both faces of the film cannot be subjected to this pretreatment because, in that case, it would no longer be possible to form peelable seals by means of this film.

The packaging film according to the present invention can be used as such as a packaging material. However, this film is preferably used in the form of a laminate with one or more other packaging films of a different nature, such as regenerated cellulose films, polypropylene films, polyamide films, polyester films, polyacrylonitrile films, polystyrene films, thin aluminum foils, paper and the like. In these laminates, the film according to the present invention is always present at the outside because it is this film which must be used to produce a peelable seal on polystyrene. In other words, it is necessary that at least one of the external faces of these laminates should be made from a film having the above-defined composition.

To form these laminates, use can be made of the well-known lamination techniques, such as adhesive lamination, extrusion lamination or coextrusion.

Because the packaging film according to the present invention makes it possible to produce excellent peelable seals on polystyrene, the film is a unique material for producing covering films intended for the hermetic sealing of polystyrene containers.

Hence, the present invention also relates to a package comprising a container made from polystyrene or from high-impact polystyrene and a covering film for the said container made from or comprising the above-mentioned packaging film.

In this new package, the shape and dimensions of the polystyrene container are not critical. It is, of course, necessary that this container should possess, in addition to a base and a sidewall, a flat upper flange made from polystyrene, the surface of which flange is sufficiently large to serve as a stable base for a covering film and that a closing seal can be produced thereon by heat sealing. As is well-known, this type of container can be produced by thermoforming from films, sheets, or plates of polystyrene or of high-impact polystyrene, the thickness of these being selected in accordance with the nature of the article which is to be packaged. The term "high-impact polystyrene" is to be understood to mean a polystyrene having a high impact strength, i.e. a polystyrene modified with 5 to 25% by weight of a rubber, for example a butadiene-styrene rubber or a polybutadiene rubber.

The novel characteristic of the package according to the present invention resides in the nature of the covering film used. According to the present invention, this covering film consists either of the heat sealable packaging film, the composition of which has been defined above, or, preferably, of a laminate of this film with one or mre films of a different nature such as those mentioned above. Of course, when the covering film is a laminate, it is necessary that the film according to the present invention should constitute at least one of the external faces of the laminate and that the covering film should be placed on and heat sealed to the flange of the container with the appropriate face of the laminate on the flange, since it is the film according to the invention which must be used for producing a peelable seal on this flange.

After filling the container, this covering film is heat sealed, under pressure, to the polystyrene flange. A tight closure is thus produced by means of an excellent peelable seal if the heat sealing is carried out at a temperature of from 150° to 200° C. Furthermore, the peelable seals thus formed can be either flat seals, if sealing pressures varying from 9.8 to 98 N/cm² are used or "profiled seals" if sealing pressures varying from 98 to 1471 N/cm² are used, the sealing times being from 0.5 to 2 seconds. By "profiled seal" we mean a seal obtained under high pressure by means of sealing jaws, at least one of which is in the form of a punch, so that in the area of the seal the covering foil has one or more grooves.

The following Examples are given for the purpose of illustrating the present invention. In these Examples, the films tested are used in the form of a laminate with a polyester (poly(ethylene terephthalate)) film. Obviously, the same results can be obtained with single non-laminated films or with films laminated to other materials. Furthermore, in these Examples, an apparatus of the MULTIVAC type is used to produce the seals by heat sealing. Finally, the values of the peel strength are measured by conventional methods, using an electronic tensile testing apparatus; the values given for the melt indices of the polymers are determined in accordance with ASTM D-1238 and are expressed in grams of polymer extruded in 10 minutes at a temperature of 190° C., whilst the values given for the density of the polyethylenes are determined in accordance with ASTM D-792 and D-1505.

EXAMPLE 1

A 50 μm thick film having the following composition is prepared by blow extrusion:
(a) 65% by weight of an ethylene-vinyl acetate copolymer containing 4% by weight of vinyl acetate and having a melt index of 2 (Petrothene NA 294 of Exxon Co.);
(b) 25% by weight of an ethylene-vinyl acetate copolymer containing 25% by weight of vinyl acetate and having a melt index of 2 (Elvax 360 of E. I. du Pont de Nemours & Co.); and
(c) 10% by weight of a crystal-clear polystyrene having a melt index of 0.6 (Lacqrene 126 B of AQUITAINE-ORGANICO).

The film obtained has the usual physical properties of packaging films. Thus, its tear strength, measured according to ASTM D-1922 by means of an Elmendorf apparatus is 144 g/foil in machine direction and 112 g/foil in transverse direction. Furthermore, this film can be extruded, reeled and laminated without difficulty.

This film is laminated, by means of an adhesive, to a 12 μm thick polyester film.

Using the laminate thus prepared, heat seals are produced between the film prepared above and a 165 μm thick polystyrene sheet and thereafter the force required to cause the seals, formed at different sealing temperatures, to peel apart (peel strength in grams per centimeter of seal width) is measured (sealing pressure=39.2 N/cm²; sealing time=1 second).

The results obtained are given in Table I below:

TABLE I

| Sealing temperature (°C.) | Peel strength (g/cm) |
|---|---|
| 160 | 530 |
| 180 | 700 |
| 200 | 800 |

The seals obtained are perfectly peelable. Thus, they can easily be ruptured by merely pulling by hand, without the laminate tearing or becoming damaged by delamination and without irregular deposits of material being observed in the areas where the seal had been produced. Furthermore, the seals can be ruptured gradually without moving by jerks.

EXAMPLE 2

A 50 μm thick film having the following composition is prepared by blow extrusion:
(a) 65% by weight of a polyethylene having a density of 0.922 g/cm³ and a melt index of 2 (Carlona 25020 FA of Shell Co.);
(b) 25% by weight of an ethylene-vinyl acetate copolymer containing 25% by weight of vinyl acetate and having a melt index of 2 (Elvax 360); and
(c) 10% by weight of a crystal clear polystyrene having a melt index of 0.6 (Lacqrene 126 B).

The properties of the film obtained are similar to those of the film of Example 1; it can be extruded, reeled and laminated without difficulty.

This film is laminated, by means of an adhesive, to a 12 μm thick polyester film.

Thereafter, tests similar to those described in Example 1 are carried out to determine the peelability of the heat seals formed between the film prepared above and a 165 μm thick polystyrene sheet. Table II gives the values of the peel strength for different sealing temperatures (sealing pressure=39.2 N/cm²; sealing time=2 seconds).

TABLE II

| Sealing temperature (°C.) | Peel strength (g/cm) |
|---|---|
| 180 | 475 |
| 190 | 500 |
| 200 | 465 |

The seals obtained are excellent from the point of view of their peelability; they have the same characteristics as those obtained in Example 1.

EXAMPLE 3

Example 1 is repeated but using the following composition:
(a) 60% by weight of a polyethylene having a density of 0.922 g/cm² and a melt index of 2 (Carlona 25020 FA);
(b) 30% by weight of an ethylene-vinyl acetate copolymer containing 25% by weight of vinyl acetate and having a melt index of 2 (Elvax 360); and
(c) 10% by weight of a crystal clear polystyrene having a melt index of 0.6 (Lacqrene 126 B).

The film obtained is non-tacky and can be extruded, reeled and laminated without difficulty.

Tests similar to those described in Example 1 are carried out to determine the peelability of the heat seals formed between the film obtained above and a 165 μm thick polystyrene sheet.

Table III gives the values of the peel strength for different sealing temperatures (sealing pressure=39.2 N/cm²; sealing time=1 second).

TABLE III

| Sealing temperature (°C.) | Peel strength (g/cm) |
|---|---|
| 180 | 315 |
| 190 | 340 |
| 200 | 350 |

The seals obtained have the same characteristics as those obtained in Examples 1 and 2.

EXAMPLE 4

Three films of 50 μm thickness having, respectively, the compositions indicated hereinafter, are prepared by blow extrusion.

Film A (a) 50% by weight of an ethylene-vinyl acetate copolymer containing 4% by weight of vinyl acetate and having a melt index of 2 (Petrothene NA 294);
(b) 30% by weight of an ethylene-vinyl acetate copolymer containing 25% by weight of vinyl acetate and having a melt index of 2 (Elvax 360); and
(c) 20% by weight of a crystal clear polystyrene having a melt index of 0.6 (Lacqrene 126 B).

Film B (a) 70% by weight of an ethylene-vinyl acetate copolymer containing 4% by weight of vinyl acetate and having a melt index of 2 (Petrothene NA 294);
(b) 20% by weight of an ethylene-vinyl acetate copolymer containing 25% by weight of vinyl acetate and having a melt index of 2 (Elvax 360); and
(c) 10% by weight of a crystal clear polystyrene having a melt index of 0.6 (Lacqrene 126 B).

Film C (a) 65% by weight of an ethylene-vinyl acetate copolymer containing 4% by weight of vinyl acetate and having a melt index of 2 (Petrothene NA 294);
(b) 25% by weight of an ethylene-vinyl acetate copolymer containing 28% by weight of vinyl acetate and having a melt index of 6 (Elvax 260); and
(c) 10% by weight of a crystal clear polystyrene having a melt index of 0.6 (Lacqrene 126 B).

The three films thus obtained have qualities similar to those of the films prepared in the preceding Examples. They can be extruded, reeled and laminated without difficulty.

Table IV gives the values of the tear strength, measured as indicated in Example 1, for each of films A, B and C:

TABLE IV

| Film tested | | Tear strength (g/foil) |
|---|---|---|
| A | MD | 56 |
|   | TD | 43 |
| B | MD | 132 |
|   | TD | 112 |
| C | MD | 144 |
|   | TD | 112 |

MD = machine direction
TD = transverse direction

Each film is laminated, by means of an adhesive, to a 12 μm thick polyester film.

By means of the three laminates thus prepared, heat seals are produced between respectively film A, film B or film C and a 600 μm thick polystyrene sheet.

Table V gives the values of the peel strength for films A, B or C at different sealing temperatures (sealing pressure=49 N/cm²; sealing time=2 seconds).

TABLE V

| Seals formed with film: | Peel strength (g/cm) | | |
|---|---|---|---|
| A | 300 | 350 | 400 |
| B | 300 | 300 | 320 |
| C | 310 | 320 | 420 |
| Sealing temperature (°C.) | 170 | 180 | 200 |

The seals formed have the same characteristics as those obtained in the preceding Examples.

EXAMPLE 5

(Comparative Example)

Blow extrusion is used to prepare a series of films not according to the present invention (thickness: 50 μm) which, respectively, have the following compositions:

(I) the composition of Example 1, in which constituent (a) has been replaced by the same amount of an ethylene-vinyl acetate copolymer containing 8% by weight of vinyl acetate and having a melt index of 2 (Baylon V 10 H 460 of BAYER AG);

(II) the composition of Example 1, in which constituent (a) has been replaced by the same amount of an ethylene-vinyl acetate copolymer containing 2% by weight of vinyl acetate and having a melt index of 0.3 (Baylon V 22 D 464 of BAYER AG);

(III) the composition of Example 2, in which constituent (a) has been replaced by the same amount of polyethylene having a density of 0.923 g/cm³ and a melt index of 0.2 (Lacqtene 1003 FE of ACQUITAINE-ORGANICO);

(IV) the composition of Example 1, in which constituent (b) has been replaced by the same amount of an ethylene-vinyl acetate copolymer containing 18% by weight of vinyl acetate and having a melt index of 2.2-2.8 (Elvax 460).

(V)

(a) 75% by weight of an ethylene-vinyl acetate copolymer containing 4% by weight of vinyl acetate and having a melt index of 2 (Petrothene NA 294); and (b) 25% by weight of an ethylene-vinyl acetate copolymer containing 25% by weight of vinyl acetate and having a melt index of 2 (Elvax 360).

(VI)

(a) 70% by weight of an ethylene-vinyl acetate copolymer containing 4% by weight of vinyl acetate and having a melt index of 2 (Petrothene NA 294);

(b) 25% by weight of an ethylene-vinyl acetate copolymer containing 25% by weight of vinyl acetate and having a melt index of 2 (Elvax 360); and (c) 5% by weight of a crystal clear polystyrene having a melt index of 0.6 (Lacqrene 126 B).

The film obtained by extrusion from composition (I) does not have a uniform thickness. Furthermore, it is so tacky that it is impossible to carry out laminating and heat sealing operations.

Films obtained from compositions (II), (III) and (IV) are each laminated, using an adhesive, to a 12 μm thick polyester film, after which tests similar to those described in Example 1 are carried out to determine the peelability of the heat seals formed between these films and a 165 μm thick polystyrene sheet.

Table VI gives the values of the peel strength for different sealing temperatures (sealing pressure =39.2 N/cm²; sealing time=2 seconds) for the film obtained from composition (II):

TABLE VI

| Sealing temperature (°C.) | Peel strength (g/cm) |
|---|---|
| 150 | 130 |
| 160 | 180 |
| 170 | 200 |

Table VI shows clearly that the peel strengths are insufficient. With the films obtained from compositions (III) and (IV), the seals obtained, even under optimum conditions, have a peel strength of less than 200 g per cm of seal with, which is totally insufficient in practice for ensuring hermetic closure of a package.

The films obtained from compositions (V) and (VI) have a tacky surface. Therefore, the extrusion thereof is difficult and they also show a tendency to adhere to the reels during reeling.

These tests show clearly that the nature and the proportions of the constituents (a), (b) and (c) are particularly critical if good packaging films producing peelable seals on polystyrene are to be obtained.

We claim:

1. A heat sealable packaging film producing a peelable seal comprising
    (a) 50 to 70% by weight of at least one ethylene polymer having a melt index of 0.5 to 7 g/10 min and selected from polyethylene having a density of from 0.910 to 0.925 g/cm³ and an ethylene-vinyl acetate copolymer containing at most 7% by weight of vinyl acetate,
    (b) 20 to 30% by weight of at least one ethylene-vinyl acetate copolymer containing 20 to 30% by weight of vinyl acetate and having a melt index of 0.5 to 7 g/10 min, and
    (c) 10 to 20% by weight of a styrene homopolymer having a melt index of 0.5 to 7 g/10 min.

2. A packaging film according to claim 1, wherein the amount of constituent (a) represents 60 to 65% by weight, the amount of constituent (b) represents 25 to 30% by weight and the amount of constituent (c) represents 10% by weight, referred to the total weight of the polymers present.

3. A packaging film according to claim 1, which additionally contains up to 10% by weight of mineral fillers and up to about 5% by weight of adjuvants conventional for packaging films, referred to the total weight of the polymer constituents (a), (b) and (c).

4. A laminated film comprising at least two dissimilar films, at least one of the external faces of said laminate being made from a heat sealable packaging film producing a peelable seal according to claim 1.

5. A package comprising (1) a container made from polystyrene or from high-impact polystyrene, said container having a base and a sidewall which extends upwardly therefrom and terminates at its upper end in a radially outwardly directed flange, and (2) a covering film for said container made from a packaging film comprising
    (a) 50 to 70% by weight of at least one ethylene polymer having a melt index of 0.5 to 7 g/10 min and selected from polyethylene having a density of from 0.910 to 0.925 g/cm³ and an ethylene-vinyl acetate copolymer containing at most 7% by weight of vinyl acetate,
    (b) 20 to 30% by weight of at least one ethylene-vinyl acetate copolymer containing 20 to 30% by weight of vinyl acetate and having a melt index of 0.5 to 7 g/10 min, and
    (c) 10 to 20% by weight of a styrene homopolymer having a melt index of 0.5 to 7 g/10 min,
said covering film being heat sealed to said radially outwardly directed flange by a peelable seal.

6. A package according to claim 5, wherein the covering film is made from a packaging film comprising 60 to 65% by weight of constituent (a), 25 to 30% by weight of constituent (b) and 10% by weight of constituent (c).

7. A package according to claim 5, wherein the covering film is made from a laminated film comprising at least two dissimilar films, at least one of the external faces of said laminate being made from the said packaging film and said covering film is heat sealed along the said face to the radially outwardly directed flange of the container by a peelable seal.

* * * * *